United States Patent Office 3,180,836
Patented Apr. 27, 1965

3,180,836
PROCESSES FOR CONTROLLING FOAMING IN AQUEOUS SYSTEMS
Myron J. Jursich, Chicago, Ill., assignor to Nalco Chemical Company, Chicago, Ill., a corporation of Delaware
No Drawing. Filed Sept. 15, 1960, Ser. No. 56,127
9 Claims. (Cl. 252—321)

This invention, in general, relates to antifoaming compositions and processes in which the normal foaming in aqueous systems is controlled, suppressed, and/or prevented by antifoaming agents in said systems.

More particularly, the invention relates to oxyethylated and/or oxypropylated castor oil or hydrogenated castor oil antifoaming compositions and the utilization of said compositions in aqueous systems having foaming tendencies for the purpose of controlling, suppressing and/or preventing foaming of said systems.

There are many industrial processes in which aqueous solutions or suspensions are processed. Frequently, due to the nature of the components in the aqueous system, foaming is a serious problem which must be prevented or mitigated to prevent interference by the foam with the efficient conduct of the processes.

Illustrative types of aqueous systems in which appreciable foaming occurs are cellulosic suspensions of the type used in the manufacture of various types of paper, sewage disposal systems, detergent-containing systems, saponin-containing systems, aqueous protein dispersions and the like. In the paper industry foaming problems are encountered in black liquor, which is the spent cooking liquor obtained after cooking of wood pulp in accordance with the sulfate or kraft process, particularly during the evaporation of black liquor prior to recovery of the chemicals in the black liquor. Foaming is also a problem in the handling and utilization of kraft pulp slurries, sulfite pulp slurries and groundwood pulp slurries in papermaking machines, including machines or apparatus used prior to formation of the fibrous mattes, such as beaters, refiners, mixers and flow boxes.

It is an object of this invention to provide antifoaming compositions useful in controlling, inhibiting and/or preventing foaming of aqueous systems which normally tend to foam.

Another object of the invention is to provide improvements in processing and/or handling of aqueous systems which normally tend to foam by the incorporation in the said systems of the antifoaming compositions of this invention.

A further object of this invention relates to the incorporation into said systems of certain oxyethylated and/or oxypropylated castor oil or hydrogenated castor oil compounds at low dosages.

In accordance with the invention, it has been found that many aqueous systems which normally tend to foam may be treated to inhibit, control and/or prevent objectionable foaming by using as the antifoaming agent a small amount of oxyethylated castor oil, oxyethylated hydrogenated castor oil, oxypropylated castor oil, oxypropylated hydrogenated castor oil, oxyethylated-oxypropylated castor oil, oxyethylated-oxypropylated hydrogenated castor oil, or derivatives thereof in which the usual basic oxyalkylation catalyst preferably is neutralized with a water-soluble organic or inorganic acid. Suitable acids for this purpose are phosphoric acid, hydrochloric acid, sulfuric acid, citric acid, acetic acid, and the like. The castor oil is oxyalkylated to give a product having 3–11 oxyalkylene groups per molecule of the castor oil or hydrogenated castor oil.

In the case of oxyethylated castor oil or hydrogenated castor oil, the number of oxyethylated groups per molecule of the castor oil is in the range of about 3–6 oxyethylene groups per molecule of the castor oil for optimum results. Where the oxyalkylating agent is 1,2-propyene oxide, the 1,2-oxypropylene groups may number from 3–11. Where the oxyalkylating agent is a mixture of ethylene oxide and 1,2-propylene oxide containing as much as 15–25% by weight of ethylene oxide, the number of oxyethylene and oxypropylene groups per molecule of castor oil should be in the range of 3–8, the lower end of the range being favored as the percentage of ethylene oxide increases.

When castor oil or hydrogenated castor oil is oxyalkylated with both ethylene oxide and 1,2-propylene oxide, the oxyalkylation may be done after the two oxides have been mixed so that the oxyalkylene groups consist of a heteric arrangement of oxyethylene and 1,2-oxypropylene groups. It is also within the contemplation of this invention to adduct the castor oil or hydrogenated castor oil with the two oxides in sequential order. Either the ethylene oxide or the propylene oxide may be added first. The terminal group is betahydroxyethyl ($-CH_2CH_2OH$) in the first case where ethylene oxide produces the last oxyalkylene group in a given oxyalkylene or polyoxyalkylene chain. With 1,2-propylene oxide, the terminal group is betahydroxyl propyl ($-CH_2CHOHCH_3$). In general oxypropylene groups are more hydrophobic than oxyethylene groups.

The amount of oxyalkylated castor oil or hydrogenated castor oil required for antifoaming purposes in aqueous systems is relatively small and can be as little as 1 p.p.m., on a weight basis of the total aqueous system. Generally, however, 5–50 p.p.m. usually will be required to give good foam control and/or foam prevention in aqueous systems which normally foam. In some extreme instances it may be necessary to use as much as 100 or 200 p.p.m. but this is not the usual case.

Many of the known methods of oxyalkylation can be used to prepare the oxyalkylated castor oil or hydrogenated castor oil products of the instant invention. One suitable technique is the feeding of the alkylene oxide or oxides into an autoclave containing the castor oil or hydrogenated castor oil. The temperature of the autoclave is maintained in the range of about 140–170° C. and a pressure within the range of 35–65 pounds per square inch gauge. A small amount of an alkaline catalyst, such as sodium or potassium hydroxide, e.g., about 0.1 to 0.2% by weight of the alkali metal hydroxide based on the weight of the final oxyalkylated castor oil, is employed.

The following examples illustrate embodiments of the invention in relation to the preparation of oxyalkylated castor oil.

EXAMPLE I

Oxyethylated castor oil is prepared by mixing together in an autoclave 130 parts of ethylene oxide, 900 parts of castor oil, and two parts of sodium hydroxide. The ethylene oxide is continuously recirculated through the castor oil at a temperature of 150–160° C. and at an initial pressure of 50–60 pounds gauge for two to four hours until substantially all the ethylene oxide is reacted. The resultant product is a 3 mol ethylene oxide adduct of castor oil.

EXAMPLE II

In a manner similar to Example I, a mixture of 50% 1,2-propylene oxide and 50% ethylene oxide is reacted with castor oil until the oxyalkylated product contains 20% by weight of oxyalkylene groups.

In a similar manner and with the same mixture of alkylene oxides, oxyethylated-oxypropylated castor oil is prepared in which the mixed oxide content is about 30% by weight.

The above-described procedures of this example are repeated with an oxide mixture consisting of 75% by weight 1,2-propylene oxide and 25% by weight ethylene oxide.

EXAMPLE III

In an autoclave, 1,2-propylene oxide is recirculated into castor oil containing 0.15% by weight, based on the castor oil, of sodium hydroxide at a temperature of 150–160° C. and at an initial pressure of 50–60 pounds per square inch gauge until there is formed oxypropylated castor oil containing 20% by weight oxyalkylene groups. The above procedure is then repeated to produce oxypropylated castor oil containing about 30% by weight and about 40% by weight oxypropylene groups.

EXAMPLE IV

The sodium hydroxide in the reaction product of any of the preceding examples is neutralized with phosphoric acid by adding 50% phosphoric acid aqueous solution in slight molar excess.

EXAMPLE V

The sodium hydroxide in the reaction product of any of the preceding examples is neutralized with citric acid by adding 50% citric acid aqueous solution in slight molar excess.

EXAMPLE VI

The sodium hydroxide in the reaction product of any of the preceding examples is neutralized with acetic acid by adding 50% acetic acid aqueous solution in slight molar excess.

EXAMPLE VII

The sodium hydroxide in the reaction product of any of the preceding examples is neutralized with hydrochloric acid by adding 50% hydrochloric acid aqueous solution in slight molar excess.

EXAMPLE VIII

This example relates to the dilution of the oxyalkylated castor oil of any of the preceding examples to make a less concentrated product which is easier to meter in the desired quantities. The diluents of this example are crude soybean oil, mineral oil, water, or a water-alcohol-soap mixture. The diluted product may be formulated as follows.

Ingredients: Percent by volume
(A)
The oxyalkylated products of any of Examples I–VII _____ 55–70
Soybean oil _____ 30–45
(B)
The oxyalkylated product of any of Examples I–VII _____ 10–90
Mineral oil _____ 90–10
(C)
The oxyalkylated product of any of Examples I–VII _____ 10–90
Water _____ 90–10
(D)
The oxyalkylated product of any of Examples I–VII _____ 5–50
50–50 water-isopropanol mixture _____ 40–94
$C_{12}$–$C_{22}$ fatty acid soap _____ 1–10

ANTIFOAM EVALUATION OF THE INVENTION

The anti-foaming agents of this invention have shown good antifoaming activity in kraft pulp stock, which has an alkaline pH in the range of about 8–10. Various antifoaming agents were tested on a synthetic kraft pulp stock by the following procedure.

Two hundred ml. of a standard kraft pulp testing stock and a measured quantity of antifoaming agent were added to a calibrated tube having a coarse sintered glass aerator at the bottom. Air was bubbled into the stock through the aerator at a rate of 36 cc./min. The amount of foam developed after 30 seconds and 60 seconds of aeration was read and recorded.

The results are reported in the following table in which the percentage of oxide is the percentage of oxyalkylene groups on a weight basis in the oxyalkylated castor oil.

*Table I.—Comparisons of various oxide derivatives of castor oil kraft dynamic foam test*

OXYALKYLATED CASTOR OIL

| Description of Oxyalkylene Portion | Dosage, p.p.m. | Foam Height (cm.) | |
|---|---|---|---|
| | | 30 Sec. | 60 Sec. |
| 20% mixed oxide (50% propylene oxide, 50% ethylene oxide) | 5 | 2.0 | 3.0 |
| | 5 | [1] 2.0 | [1] 2.7 |
| Do | 10 | 1.5 | 2.0 |
| | 10 | [1] 1.7 | 2.5 |
| 29.4% mixed oxide (50% propylene oxide, 50% ethylene oxide) | 5 | 4.0 | 6.0 |
| | 5 | [1] 2.7 | [1] 3.7 |
| Do | 10 | 2.0 | 2.8 |
| | 10 | [1] 1.8 | [1] 2.3 |
| 20% propylene oxide | 5 | 2.2 | 3.5 |
| | 5 | [1] 1.8 | [1] 1.8 |
| Do | 7.5 | [1] 1.8 | [1] 1.8 |
| 29.4% propylene oxide | 5 | 3.0 | 5.0 |
| | 10 | [1] 1.7 | [1] 1.7 |
| Do | 7.5 | [1] 8.5 | [1] 9.5 |
| 40.2% propylene oxide | 5 | 2.5 | 4.0 |
| | 10 | [1] 2.2 | [1] 3.2 |
| Do | 7.5 | [1] 2.9 | [1] 2.3 |
| 20% mixed oxide (70% propylene xoide, 25% ethylene oxide) | 5 | 3.0 | 6.0 |
| | 5 | [1] 1.8 | [1] 2.2 |
| Do | 10 | 2.0 | 2.5 |
| 29.4% mixed oxide (75% propylene oxide, 25% ethylene oxide) | 5 | 2.0 | 3.4 |
| | 5 | [1] 1.6 | [1] 2.5 |
| Do | 10 | 2.0 | 2.0 |
| 40.2% mixed oxide (75% propylene oxide, 25% ethylene oxide) | 5 | 7.5 | 7.5 |
| | 5 | [1] 3.6 | [1] 4.5 |
| 3-mol ethylene oxide adduct | 5 | 1.9 | 2.9 |
| | 5 | [1] 1.5 | [1] 1.8 |
| Do | 7.5 | 1.8 | 2.4 |

[1] Alkaline catalyst neutralized with hydrochloric acid.

Antifoaming tests on standard sulfite paper stock, groundwood paper stock, saponin solution (1.5 gm. per 3 liters tap water, pH 2), and detergent (0.5 g. Oronite D–40) with an antifoaming agent comprising oxyethylated castor oil (11% ethylene oxide) showed that the antifoaming agent controlled the foaming tendencies at the following dosages of antifoaming agent:

P.p.m.
Sulfite paper stock _____ 8
Groundwood paper stock _____ 20
Saponin solution _____ 50
Detergent _____ 100

The antifoaming agents of this invention may be used to control or suppress foam in the evaporation of black liquor or in the brown stock washing stage in the processing of black liquor. They may be used to control or suppress foam in the processing of soybean protein extract or other foaming protein-containing aqueous systems, in processing saponin aqueous solutions, or in foaming aqueous detergent-containing systems, including sewage treatment of detergent-containing sewage water.

In paper making processes, the antifoam can be used with effectiveness to control or suppress foam in stock chests, machine chests, stuffing boxes, headboxes, and/or in the paper-forming stages in Fourdrinier or cylinder paper making machines.

The invention heretofore described is set forth in the following claims where "castor oil" means unhydrogenated, partially hydrogenated or fully hydrogenated castor oil.

I claim:

1. A process for controlling foaming in an aqueous system which normally tends to foam which comprises adding to said aqueous system a small but sufficient amount to control said foam of oxyalkylated castor oil in which the oxyalkylene groups have 2–3 carbons and number from 3–11 oxyalkylene groups per molecule of castor oil, said oxyalkylated castor oil being produced by the oxyalkylation of castor oil with an alkylene oxide selected from the group consisting of ethylene oxide, propylene oxide, and both ethylene oxide and propylene oxide at a temperature in the range of about 140–170° C. and at a pressure within the range of 35–65 p.s.i.g. in the presence of about 0.1 to 0.2% by weight of an alkali metal hydroxide, based on the weight of the resultant oxyalkylated castor oil.

2. A process for controlling foaming of an aqueous system which normally tends to foam which comprises adding to said aqueous system a small but sufficient amount to control foaming of said aqueous system of oxyethylated castor oil in which the number of oxyethylene groups are in the range of 3–6 per molecule of castor oil, said oxyethylated castor oil being produced by the oxyethylation of castor oil with ethylene oxide at a temperature in the range of about 140–170° C. and at a pressure within the range of 35–65 p.s.i.g. in the presence of about 0.1 to 0.2% by weight of an alkali metal hydroxide, based on the weight of the resutlant oxyalkylated castor oil.

3. A process for controlling foaming of an aqueous system which normally tends to foam which comprises adding to said aqueous system a small but sufficient amount to control foaming of said aqueous system of an oxyalkylated castor oil in which the oxyalkylene groups groups consist of both oxyethylene and oxypropylene groups and a number in the range of 3–8 oxyalkylene groups per molecule of castor oil, said oxyalkylated castor oil being produced by the oxyalkylation of castor oil with both ethylene oxide and propylene oxide at a temperature in the range of about 140–170° C. and at a pressure within the range of 35–65 p.s.i.g. in the presence of about 0.1 to 0.2% by weight of an alkali metal hydroxide, based on the weight of the resultant oxyalkylated castor oil.

4. A process for controlling foaming of an aqueous system which normally tends to foam which comprises adding to said aqueous system a small but sufficient amount to control foaming of said aqueous system of oxypropylated castor oil in which the number of oxypropylene groups is in the range of 3–11 oxypropylene groups per molecule of castor oil, said oxypropylated castor oil being produced by the oxypropylation of castor oil with propylene oxide at a temperature in the range of about 140–170° C. and at a pressure within the range of 35–65 p.s.i.g. in the presence of about 0.1 to 0.2% by weight of an alkali metal hydroxide, based on the weight of the resultant oxypropylated castor oil.

5. A process for controlling foaming of an aqueous system which normally tends to foam which comprises adding to said aqueous system a small but sufficient amount to control said foam of oxyalkylated castor oil in which the oxyalkylene groups have 2–3 carbons and number from 3–11 oxyalkylene groups per molecule of castor oil, the alkali used as an oxylalkylation catalyst in producing said oxyalkylated castor oil being neutralized with a water-soluble acid, said oxyalkylated castor oil being produced by the oxyalkylation of castor oil with an alkylene oxide selected from the group consisting of ethylene oxide, propylene oxide, and both ethylene oxide and propylene oxide at a temperature in the range of about 140–170° C. and at a pressure within the range of 35–65 p.s.i.g. in the presence of about 0.1 to 0.2% by weight of an alkali metal hydroxide, based on the weight of the resultant oxyalkylated castor oil.

6. A process for controlling foaming of an aqueous system which normally tends to foam which comprises adding to said aqueous system a small but sufficient amount to control foaming of said aqueous system of oxyethylated castor oil in which the number of oxyethylene groups are in the range of 3–6 per molecule of castor oil, the alkali used as an oxyalkylation catalyst in producing said oxyethylated castor oil being neutralized with a water-soluble acid, said oxyethylated castor oil being produced by the oxyethylation of castor oil with ethylene oxide at a temperature in the range of about 140–170° C. and at a pressure within the range of 35–65 p.s.i.g. in the presence of about 0.1 to 0.2% by weight of an alkali metal hydroxide, based on the weight of the resultant oxyalkylated castor oil.

7. A process for controlling foaming of an aqueous system which normally tends to foam which comprises adding to said aqueous system a small but sufficient amount to control foaming of said aqueous system of an oxyalkylated castor oil in which the oxyalkylene groups consist of both oxyethylene and oxypropylene groups and number in the range of 3–8 oxyalkylene groups per molecule of castor oil, the alkali used as an oxyalkylation catalyst in producing said oxyethylated-oxypropylated castor oil being neutralized with a water-soluble acid, said oxyalkylated castor oil being produced by the oxyalkylation of castor oil with both ethylene oxide and propylene oxide at a temperature in the range of about 140–170° C. and at a pressure within the range of 35–65 p.s.i.g. in the presence of about 0.1 to 0.2% by weight of an alkali metal hydroxide, based on the weight of the resultant oxyalkylated castor oil.

8. A process for controlling foaming of an aqueous system which normally tends to foam which comprises adding to said aqueous system a small but sufficient amount to control foaming of said aqueous system of oxypropylated castor oil in which the number of oxypropylene groups is in the range of 3–11 oxypropylene groups per molecule of castor oil, the alkali used as an oxyalkylation catalyst in producing said oxypropylated castor oil being neutralized with a water-soluble acid, said oxypropylated castor oil being produced by the oxypropylation of castor oil with propylene oxide at a temperature in the range of about 140–170° C. and at a pressure within the range of 35–65 p.s.i.g. in the presence of about 0.1 to 0.2% by weight of an alkali metal hydroxide, based on the weight of the resultant oxypropylated castor oil.

9. The process of claim 1 wherein the aqueous system is a kraft pulp stock.

References Cited by the Examiner

UNITED STATES PATENTS

| 2,308,222 | 1/43 | Walton et al. | 260—410.7 |
|---|---|---|---|
| 2,390,212 | 12/45 | Fritz | 106—131 |
| 2,542,550 | 2/51 | McDermott | 260—410.7 |
| 2,748,085 | 5/56 | Monson | 252—321 |
| 2,903,432 | 9/59 | Hwa | 252—321 |

JULIUS GREENWALD, *Primary Examiner.*

UNITED STATES PATENT OFFICE
CERTIFICATE OF CORRECTION

Patent No. 3,180,836 April 27, 1965

Myron J. Jursich

It is hereby certified that error appears in the above numbered patent requiring correction and that the said Letters Patent should read as corrected below.

Column 2, line 3, for "propyene" read -- propylene --; line 21, for "the first case" read -- the case --; column 4, Table I, first column, line 13 thereof, for "70% propylene xoide" read -- 75% propylene oxide --.

Signed and sealed this 26th day of October 1965.

(SEAL)
Attest:

ERNEST W. SWIDER
Attesting Officer

EDWARD J. BRENNER
Commissioner of Patents